United States Patent [19]

Brownell et al.

[11] Patent Number: 4,473,714

[45] Date of Patent: Sep. 25, 1984

[54] CABLE SHIELD BOND CONNECTOR

[75] Inventors: Kenneth W. Brownell, Asheville; Louis Ance, Newton; Joseph C. Carswell, Enka, all of N.C.

[73] Assignee: Akzona Incorporated, Asheville, N.C.

[21] Appl. No.: 305,747

[22] Filed: Sep. 25, 1981

[51] Int. Cl.³ .................. H02G 15/02; H01R 4/06
[52] U.S. Cl. .................. 174/78; 339/14 L; 339/95 R; 411/501; 411/504
[58] Field of Search .......... 174/78; 339/14 L, 95 R, 339/97 R, 97 C; 411/501, 504; 24/141

[56] References Cited

U.S. PATENT DOCUMENTS

| | | | |
|---|---|---|---|
| 367,590 | 8/1887 | Boyle | 24/141 |
| 629,754 | 7/1899 | Popham | 24/141 |
| 3,644,869 | 2/1972 | Newman | 339/19 |
| 3,777,049 | 12/1973 | Gillemot et al. | 174/78 |
| 3,857,994 | 12/1974 | Neale | 174/78 |
| 3,963,299 | 6/1976 | Thompson et al. | 339/95 R |
| 4,023,882 | 5/1977 | Pettersson | 339/96 |
| 4,140,870 | 2/1979 | Volkers et al. | 174/78 |
| 4,320,252 | 3/1982 | Holman et al. | 174/78 X |

FOREIGN PATENT DOCUMENTS 1222067 2/1971 United Kingdom ............ 339/97 R

Primary Examiner—J. V. Truhe
Assistant Examiner—Morris H. Nimmo
Attorney, Agent, or Firm—Francis W. Young; David M. Carter

[57] ABSTRACT

There is provided a termination assembly for a cable shield which is particularly useful in connecting the shield to ground. The termination includes a tubular rivet for compressing a serrated ring into the shield for making electrical and mechanical termination. A resilient Belleville washer is compressed by the rivet for maintaining the termination.

5 Claims, 3 Drawing Figures

CABLE SHIELD BOND CONNECTOR

BACKGROUND OF THE INVENTION

This invention relates to an electrical termination system. More particularly, it relates to a telephone cable shield bond connector.

Telephone cable, particularly buried cable, often includes a metal shield which provides both mechanical and electrical protection for the primary conductors in the core. This metal shield surrounds the core and is particularly useful in insuring that lightning does not penetrate the core. In order to provide this electrical protection, the shield must be properly grounded. Thus, the shield must be terminated so it may be connected to a ground post, and so that the shields of adjacent cables may be spliced together by a jumper. Obviously, this termination must be very reliable.

A standard technique to terminate a shield is to punch a hole through the polyethylene jacket of the cable and through the shield and insert a threaded stud through the hole with the base of the screw head having serrations for penetrating into the shield. A nut is tightened down onto the stud and on to the polyethylene jacket, thus driving the serrations down into the shield and holding it in place. One of the problems with this type of termination system is that the polyethylene jacket tends to flow, even at relatively low temperatures, as what is known as cold flow. This permits the assembly to loosen, and, therefore, any electrical connection which is made to the assembly becomes unreliable. One such termination system is set forth in U.S. Pat. No. 4,023,882, which also uses a lock washer to secure the screw head.

Another cable shield bond device is disclosed in U.S. Pat. No. 3,857,994. This patent utilizes a rivet having serrations in the base for penetrating into the shield. The top of the rivet barrel is terminated to a rigid dome-shaped member which is further connected to an electrical jumper. The dome-shaped member and the base of the rivet compress a pair of rubber resilient members, which in turn maintain electrical contact between the serrated ring and the shield. The specification does not lead one to believe that the dome-shaped member is itself resilient.

U.S. Pat. No. 3,963,299 also shows a shield bond connector which utilizes a serrated plate for biting into the shield of the cable. A cover plate, which generally conforms to the shape of the cable, is terminated over the top of the cable and, along with a stud and screw combination, holds the serrated pressure plate in place.

In a field somewhat removed from shield bond connectors, U.S. Pat. No. 3,644,869 shows the use of a Belleville washer in an electrical connector assembly. The Belleville washer serves as a spring to provide connection forces.

OBJECTS OF THE INVENTION

It is, therefore, one object of the invention to provide an improved reliable cable shield bond connector.

It is another object to provide a simple and inexpensive means for terminating a cable shield.

It is still another object to provide a shield bond connector which remains terminated in spite of the cold flow problem associated with the cable jacket material.

SUMMARY OF THE INVENTION

In accordance with one form of this invention, there is provided an assembly for terminating a cable shield having a cable connector with a base and tubular throughbore. The base includes serrations for penetrating and bonding to a cable shield. The tubular throughbore is received in a pre-formed hole in the cable shield. A resilient metal dome having a hole therethrough receives the tubular throughbore. A mechanism is provided for compressing the resilient dome and holding the dome in its compressed state while the assembly is terminated to the cable shield for maintaining electrical and mechanical contact between the penetrating serrations and the shield.

In accordance with another form of this invention, there is provided a method for terminating a cable shield by exposing the inside surface of the shield to the outside of the core of the cable. A hole is formed through the shield. The tubular member of a tubular rivet is passed through the hole in the shield so that a portion of the tubular member protrudes to the outside of the cable. Serrations on the base of the tubular rivet contact the shield. The protruding portion of the tubular member is placed through the bore of a Belleville washer. The washer has its concaved surface facing the shield. A threaded stud is passed through the tubular member and the bore in the Belleville washer. A wedge and a nut are attached onto the stud and tightened about the stud so as to swage or bend the top of the tubular member outwardly and onto the convexed side of the Belleville washer, thereby flexing the washer inwardly and driving and holding the serrations into the shield.

BRIEF DESCRIPTION OF THE DRAWINGS

The subject matter which is regarded as the invention is set forth in the appended claims. The invention, however, together with further objects and advantages thereof, may be better understood when taken in conjunction with the following drawings, in which:

DESCRIPTION OF THE PREFERRED EMBODIMENT

Figure 1:
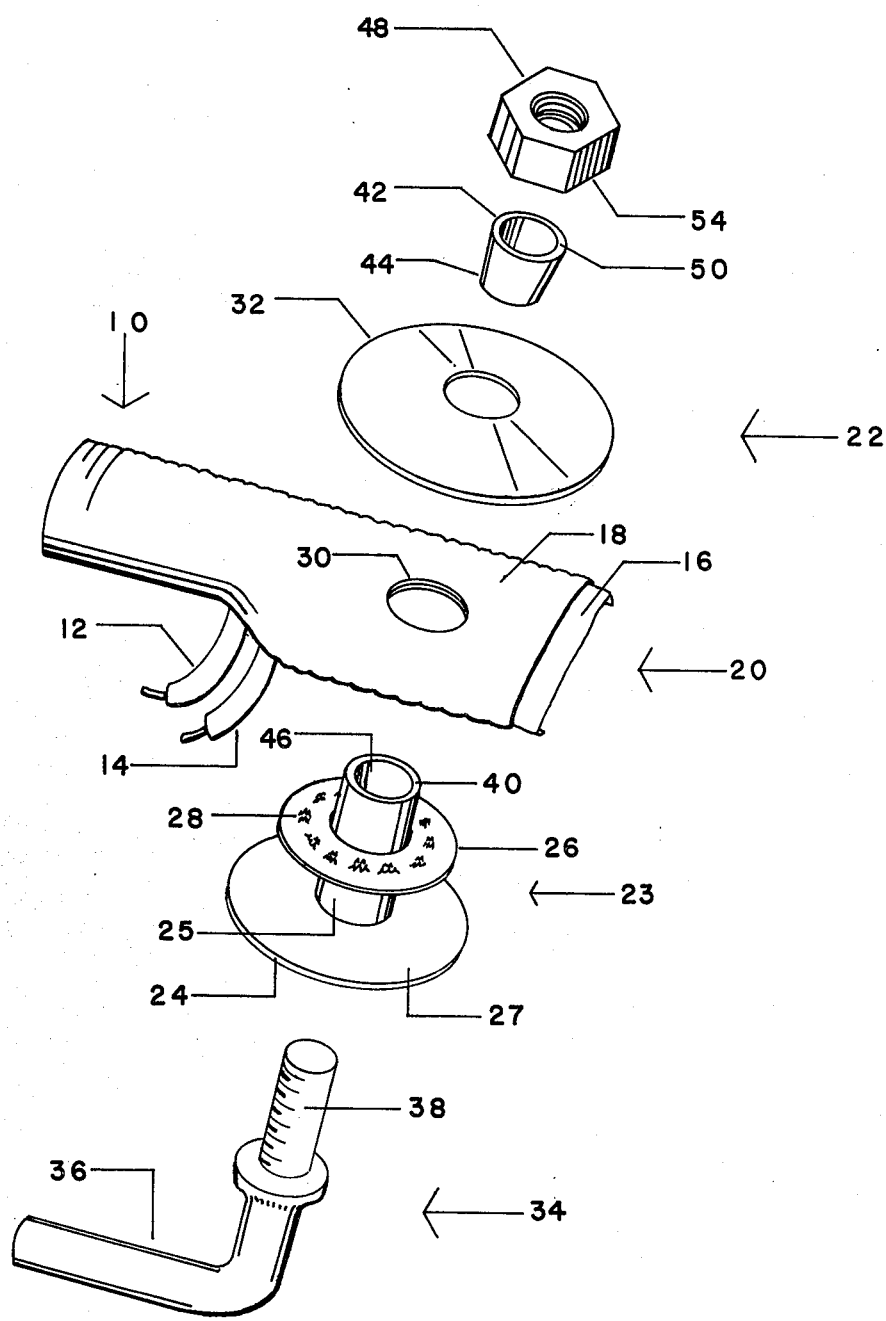
FIG. 1 is an exploded view of the termination assembly of the subject invention, including the parts utilized in the method for termination.

Referring now more particularly to FIG. 1, there is provided telephone cable 10, including a core housing a pair of conductors 12 and 14. Cable 10 further includes metal shield 16 and polyethylene jacket 18. The shield and jacket have been peeled away from the core of the cable to form a flattened end section 20 which is adapted to be terminated. In some instances, the inside surface of the shield 16 is coated with a plastic material to prevent corrosion.

The termination system 22 includes connector base 24, which is in the form of a tubular rivet. Tubular rivet 23 includes a tubular member 25 and base member 24, which are integral with one another. A serrated ring 26 is received about tubular member 25, and rides against the top portion 27 of the connector base 24 forming a pressure plate against serrated ring 26. Serrated ring 26 includes a plurality of serrations or teeth 28, which are adapted to pierce the cable shield and make the electrical termination thereto. Alternatively, the connector base itself could have cable shield piercing serrations thereon, thus eliminating the serrating ring. The tubular member of the connector base 24 is adapted to pass through hole 30, which has been pre-formed through the cable jacket and shield by standard hole punch. The tubular member passes through the hole 30 to the extent that the serrated ring rests against the cable shield 16. The tubular member further passes through connector dome 32, which is resilient, and, in this embodiment, is in the form of a Belleville washer.

Mounting bolt 34 may be a standard bolt or a specially designed hand held bolt, as shown in FIG. 1. Mounting bolt 34 includes handle 36 and threaded stud 38, which is adapted to pass through the bore of the tubular member 25, thus protruding through the end portion 40 of the tubular member. A swaging collar 42 passes over the end of stud 38, and the lower outer periphery surface 44 of the swaging collar makes contact with the inner surface 46 of the tubular member.

Figure 2:
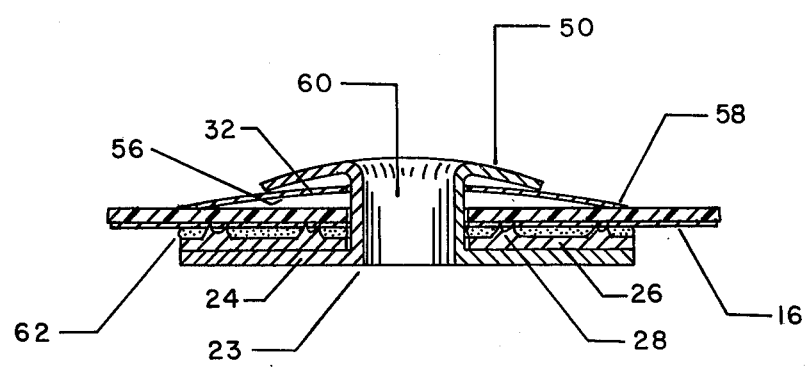
FIG. 2 is a cross-sectional view of the connector assembly of FIG. 1 after having been terminated to the shield of the cable.
Figure 3:
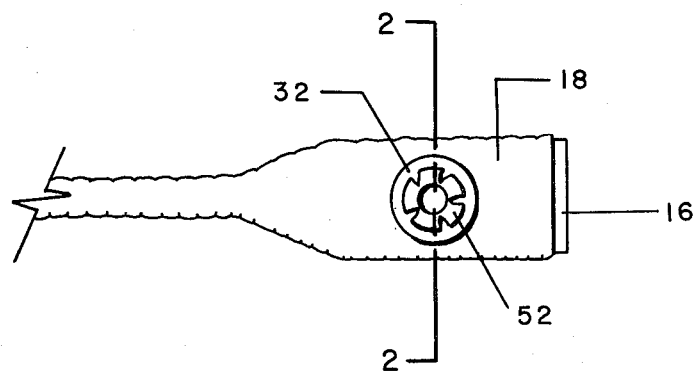
FIG. 3 is a top view of the termination assembly of FIG. 2.

As can be seen, swaging collar 42 is somewhat conical in shape. Driving nut 48 is threaded and is received over the top and makes contact with the upper surface 50 of the swaging collar, and is mounted on stud 38. Alternatively, the nut and swedging collar could be of a single piece construction. A tool, such as a wrench or nut driver, is adapted to turn nut 48 down the barrel of stud 38 which drives swaging collar 42 into the throat of tubular member 25. Tubular member 40 is bent back as shown in FIGS. 2 and 3, and particularly indicated as ends 50, forming, in most situations, four leaves 52. Leaves 52, having been made through the action of the swaging collar and the bottom portion 54 of the nut, rest against the resilient connector dome 32, riveting or fastening the termination together. Also, as the nut 48 is turned along stud 38, connector base drives the serrations 28 of ring 26 into cable shield 16. Once the nut is turned down slightly and the leaves are formed tightly down on Belleville washer 32, with the concaved surface 56 of the Belleville washer being flexed inwardly into the cable jacket 18, the rivet leaves hold the assembly in place. The Belleville washer, being flexed inwardly, applies constant force on the serrated ring, pressing it into cable shield.

Furthermore, the dome shape of the Belleville washer will hold the polyethylene in the cable jacket 18 in place, thusly eliminating cold flow, because the jacket material is trapped along the edges 58 of the Belleville washer.

FIG. 2 shows the termination system after the termination tools, namely, the bolt 34, swaging collar 42 and nut 48 have been removed. As can be seen, the termination presents a tubular connection through the bore 60 of rivet 23 so that the termination may be connected to a station protector ground stud or a ordinary bolt by simply running the bolt through the bore much like the tool bolt 34 was done. A jumper wire is usually connected to the bolt by an appropriate nut.

As can be seen from FIG. 2, serrations 28 are driven deeply into cable shield 16 to form the electrical contacts. A sealing gel 62 is provided between the top portion of the serrated ring and the core side of the cable shield 16. This sealing gel corrosion at the point of contact of the serrations 28.

Thus, it can be seen that a simplified shield bond termination has been provided having almost no tool expense requirements and using very few piece parts. Furthermore, by using the rivet/Belleville washer resilient technique, it has been found that this termination is much more reliable than the prior art terminations.

From the foregoing description of the illustrative embodiment of this invention, it will be apparent that many modifications may be made therein. It will be understood, therefore, that this embodiment of the invention is intended as an exemplification of the invention only, and that the invention is not limited thereto. It is to be understood that it is intended that the appended claims cover all such modifications that shall fall within the true spirit and scope of the invention.

We claim:

1. A connector for terminating a cable shield which is located under a cable jacket, comprising:
   a base assembly and a tubular throughbore connected to said base assembly, said base assembly including serrations for penetrating and bonding to the cable shield, said tubular throughbore adapted to penetrate a hole in the cable shield and in the cable jacket;
   a circular resilient metal member having a hole therethrough receiving said tubular throughbore; said circular resilient metal member being dome-shaped prior to termination of said connector to the cable shield; one side of said circular resilient metal member contacting the cable jacket; p1 means for compressing said resilient member and holding said resilient member into its compressed state while said connector is terminated to said shield for maintaining electrical and mechanical contact between said serrations and the shield; said circular resilient metal member being substantially flexed inwardly after termination of said connector to the cable shield.

2. A connector as set forth in claim 1, wherein said metal member is a washer.

3. A connector as set forth in claim 1, wherein said base assembly includes a pressure plate coupled to said tubular throughbore and further including a separate serrated ring contacting said pressure plate.

4. A connector as set forth in claim 1, wherein said means for compressing and holding said metal member is the free end of said tubular member, said free end of said tubular member being bent back onto the top surface of said resilient metal member, forming a rivet.

5. An assembly as set forth in claim 1, further including sealing gel between said base assembly and said shield.

* * * * *